United States Patent
Xiao et al.

(10) Patent No.: US 11,550,571 B2
(45) Date of Patent: Jan. 10, 2023

(54) GENERATION OF EQUIVALENT MICROSERVICES TO REPLACE EXISTING OBJECT-ORIENTED APPLICATION

(71) Applicant: International Business Machines Corporation, Armonk, NY (US)

(72) Inventors: Jin Xiao, White Plains, NY (US);
Anup Kalia, White Plains, NY (US);
Saurabh Sinha, Danbury, CT (US);
John Rofrano, Mahopac, NY (US);
Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 17/023,560

(22) Filed: Sep. 17, 2020

(65) Prior Publication Data
US 2022/0083334 A1  Mar. 17, 2022

(51) Int. Cl.
*G06F 9/22* (2006.01)
*G06F 9/54* (2006.01)
*G06F 8/30* (2018.01)

(52) U.S. Cl.
CPC ............ *G06F 9/22* (2013.01); *G06F 8/315* (2013.01); *G06F 9/541* (2013.01)

(58) Field of Classification Search
CPC ............ G06F 9/22; G06F 9/541; G06F 8/315
USPC ........................................................ 717/108
See application file for complete search history.

(56) References Cited

U.S. PATENT DOCUMENTS

| | | | |
|---|---|---|---|
| 5,842,223 A * | 11/1998 | Bristor | G06F 9/4488 |
| 8,468,042 B2 | 6/2013 | Jaluka | |
| 9,509,782 B2 | 11/2016 | Lawson | |
| 10,430,250 B2 | 10/2019 | Ishikawa | |
| 10,545,738 B1 | 1/2020 | Jaeger | |
| 10,579,370 B2 | 3/2020 | Gupta | |
| 2002/0059212 A1* | 5/2002 | Takagi | G06F 9/548 |
| 2003/0229885 A1* | 12/2003 | Gownder | G06F 8/36 717/115 |
| 2009/0204662 A1* | 8/2009 | Meo | G06F 16/957 709/246 |
| 2018/0113746 A1* | 4/2018 | Mora Lopez | G06F 9/5016 |
| 2018/0365008 A1* | 12/2018 | Chandramouli | G06F 8/76 |
| 2019/0205106 A1 | 7/2019 | Sharma | |
| 2019/0250912 A1 | 8/2019 | Gavisiddappa Kodigenahalli | |
| 2019/0334789 A1 | 10/2019 | Roche | |
| 2020/0285451 A1* | 9/2020 | Agarwal | G06F 8/36 |

(Continued)

FOREIGN PATENT DOCUMENTS

CN     108279926 A     7/2018

*Primary Examiner* — Chat C Do
*Assistant Examiner* — Bradford F Wheaton
(74) *Attorney, Agent, or Firm* — David B. Woycechowsky (57) ABSTRACT

Technology for dividing a monolith computer program into a plurality of functions and creating a microservice for each function of the model's computer program. The microservices are semantically and functionally equivalent, taken collectively, to the model's computer program from which they came. In some embodiments, the monolith computer program is written in an object oriented programming language suitable for execution by a virtual machine (VM). In some embodiments, the microservices are in representational state transfer (REST) form and respectively corresponding application programming interface (API).

1 Claim, 8 Drawing Sheets

(56) References Cited

U.S. PATENT DOCUMENTS

2020/0401386 A1\* 12/2020 Punathil ................. G06F 8/433
2021/0326237 A1\* 10/2021 Moser ................. G06F 11/3612

\* cited by examiner

SCREEN SHOT DISPLAY GENERATED BY A COMPUTER

FIRST NAME ?  JOHN

LAST NAME ?  DOE

EYE COLOR ?  GREEN

JOHN DOE HAS GREEN EYES.

GENERATION OF EQUIVALENT MICROSERVICES TO REPLACE EXISTING OBJECT-ORIENTED APPLICATION

BACKGROUND

The present invention relates generally to the field of microservices and more particularly to generating code for new microservices.

SUMMARY

According to an aspect of the present invention, there is a method, computer program product and/or system that performs the following operations (not necessarily in the following order): (i) receiving a computer program; (ii) determining a first function that is performed by operation of the computer program; and (iii) generating, by machine logic, a first microservice that is functionally and semantically equivalent to the first function as performed by the computer program to obtain a respectively corresponding first microservice.

DETAILED DESCRIPTION

Technology for dividing a monolith computer program into a plurality of functions (sometimes herein referred to as "partitions") and creating a microservice for each function of the model's computer program. The microservices are semantically and functionally equivalent, taken collectively, to the model's computer program from which they came. In some embodiments, the monolith computer program is written in an object oriented programming language suitable for execution by a virtual machine (VM). In some embodiments, the microservices are in representational state transfer (REST) form and respectively application programming interface (API). This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
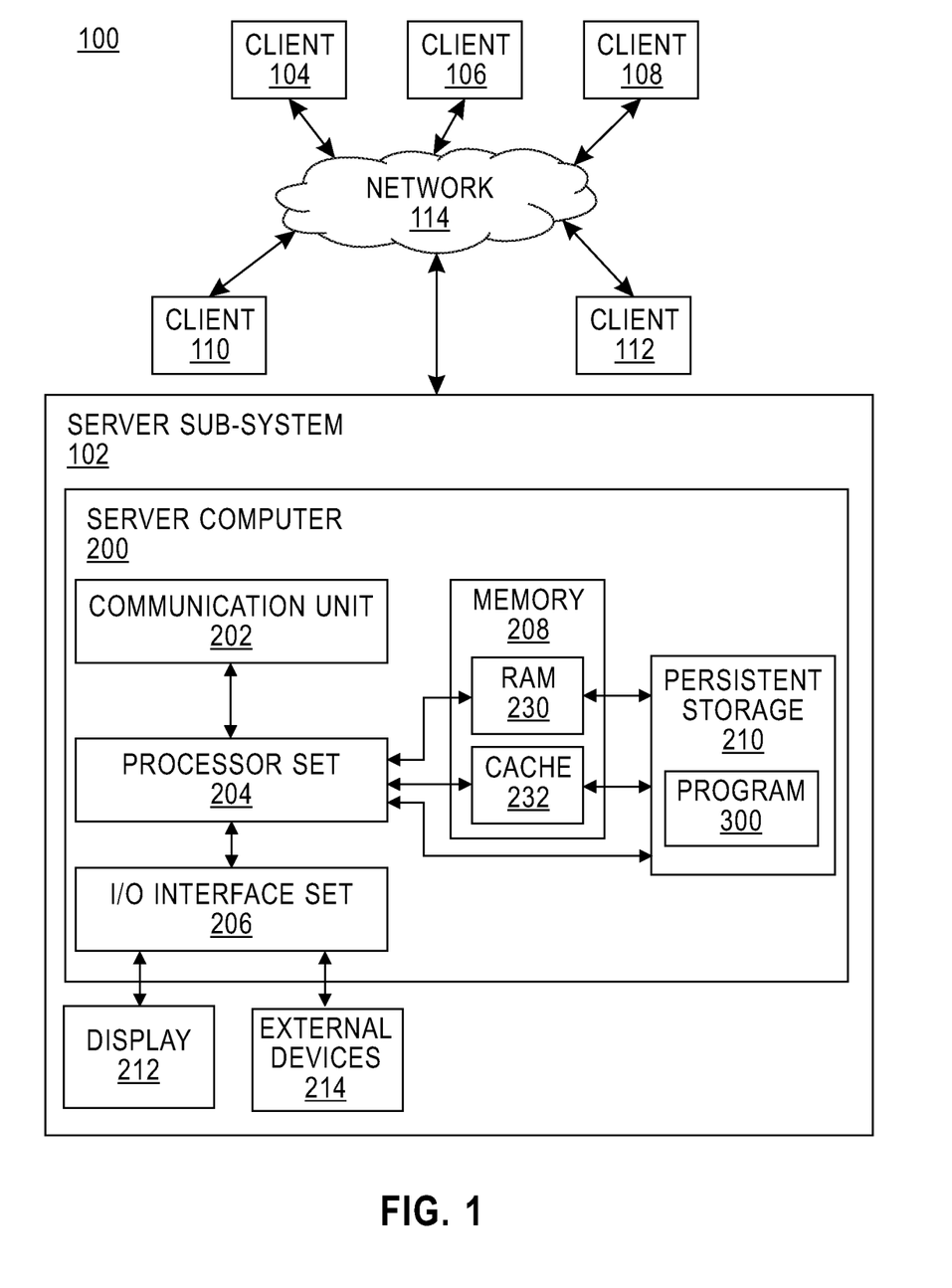
FIG. 1 is a block diagram of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
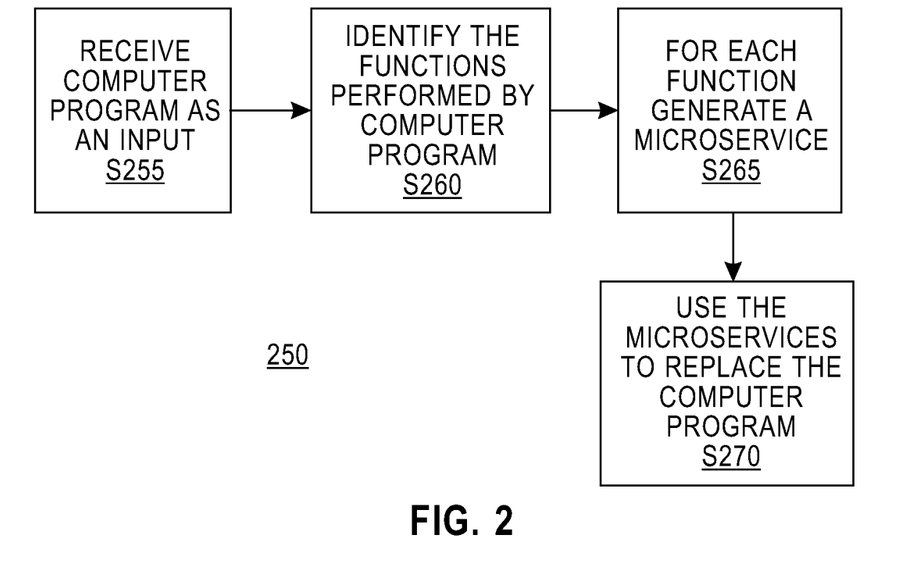
FIG. 2 is a flowchart showing a first embodiment method performed, at least in part, by the first embodiment system.
Figure 3:
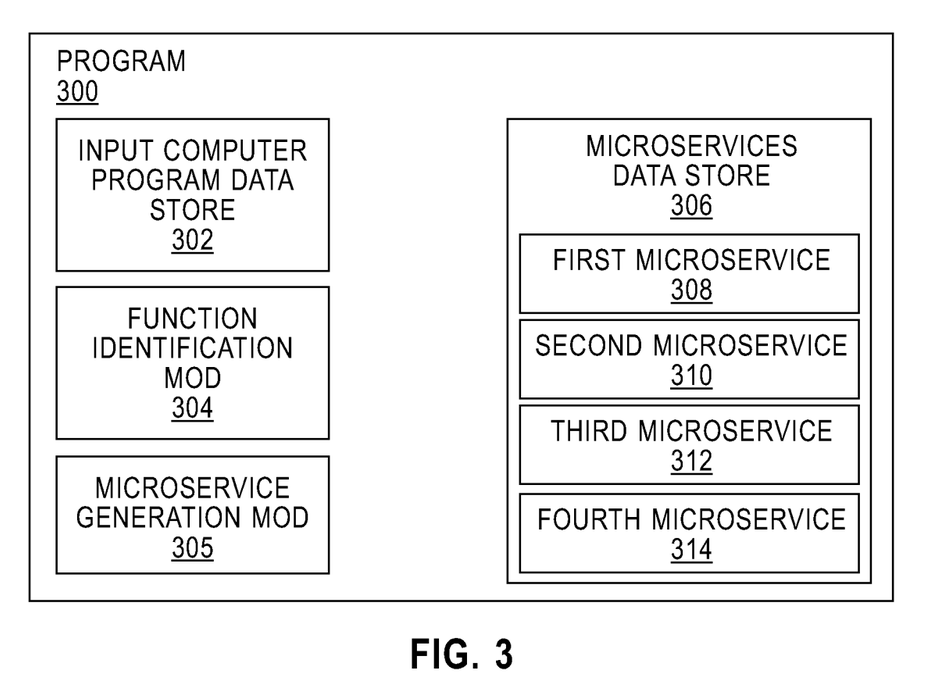
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Figure 4:
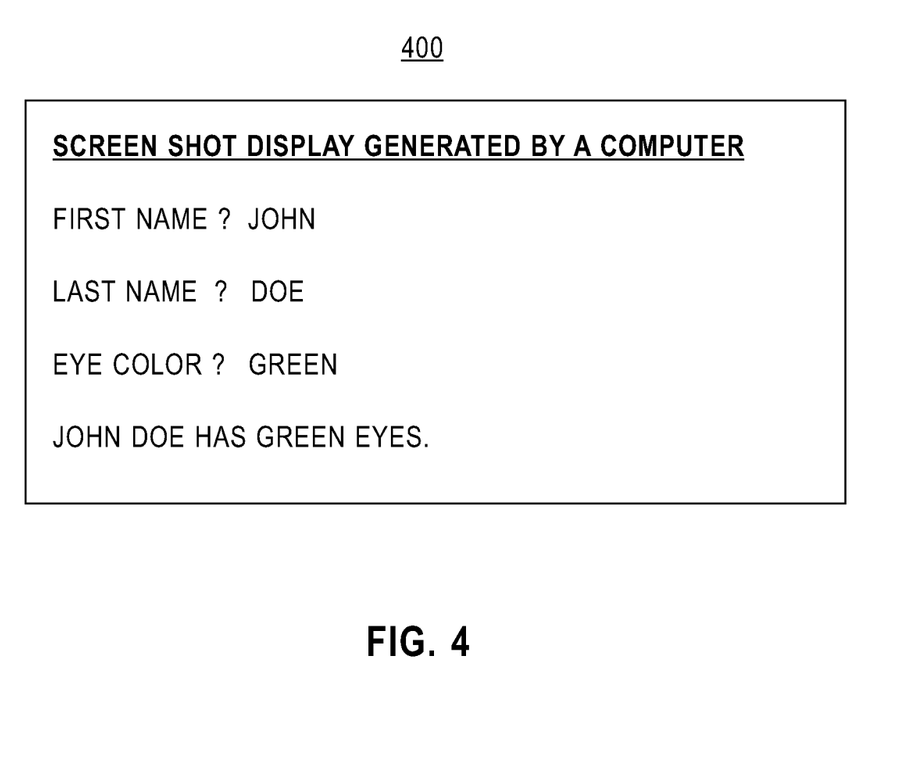
FIG. 4 is a screenshot view generated by the first embodiment system.

Processing begins at operation S255, where input computer program data store 302 receives the code for a computer program that is to be converted into multiple REST API style microservices. It is noted that this example converts the computer program into multiple microservices. Alternatively, some embodiments may only convert a portion of the computer program into microservices, such as embodiments where only a single microservice is extracted from the computer program. It is further noted that this example uses REST API style microservices, other styles of microservices (now known or to be developed in the future) may be used in some embodiments. In this example, the computer program is written in BASIC. Here is the code for this highly simplified example:

```
10 INPUT "FIRST NAME?";F$
20 INPUT "LAST NAME?";L$
30 INPUT "EYE COLOR?";E$
40 PRINT F$;L$;"HAS";E$;"EYES"
```

The various functions of this short input computer program can be more readily understood by review of screenshot 400 of FIG. 4. In this example, the input computer program is received from client sub-system 104 through communication network 114.

Processing proceeds to operation S260, where function identification module ("mod") 304 uses its machine logic to divide the input computer program into multiple functions. This is done in a manner so that: (i) every action performed by the input computer program is covered under one of the functions (note: this is herein referred to as "functional equivalence"); and (ii) each function does not cover too many actions to be suitable for a single microservice (see definition of "microservice," above, in the Background section). In this simplified example, the four (4) line input computer is divided into four (4) functions, with each microservice to be developed corresponding to one of the lines of code in the input computer program. The following sub-section of this Detailed Description section may have more information on dividing an input program into an appropriate number of functions, especially in the context of object oriented computer programs that run on Java virtual machine platforms.

Processing proceeds to operation S265, where the machine logic of microservice generation mod 305 generates a REST API (application programming interface) style microservice for each function identified at operation S260. As mentioned above, some embodiments may extract microservices for only a portion of the functions of the computer program, such as embodiments that extract only a single microservice from the computer program. In this example, the four microservices (that is, first microservice 308, second microservice 310, third micro service 312 and fourth microservice 314) are stored in microservices data store 306. These microservices respectively perform the following functions: (i) first microservice 308 receives an alphanumeric first name string from a user and denominates it as the variable F$; (ii) second microservice 310 receives an alphanumeric last name string from a user and denominates it as the variable L$; (iii) third microservice 312 receives an alphanumeric eye color string from a user and denominates it as the variable E$; and (iv) fourth microservice 314 displays on a display screen and in a certain order: F$, L$, E$ and a couple of words of predetermined, hard coded text. In addition to the functional equivalence mentioned above, there is also "semantic equivalence." In this simple example, this means that: (i) the first name string is denominated as F$ in the microservice(s) that include it; (ii) the last name string is denominated as L$ in the microservice(s) that include it; and (iii) the eye color string is denominated as E$ in the microservice(s) that include it.

Processing proceeds to operation S270, where client sub-system 106 runs the microservices in the microservices data store through communication network 114, instead of running the input computer program stored in the input computer program data store. In this way, the microservices replace the input computer program. The microservices, working together, will produce the outputs shown in screenshot 400 of FIG. 4, just like the BASIC language input program because the microservices are functionally equivalent to the BASIC language input program.

TRANSLATOR: It is noted that at least some embodiments of the present invention are not considered to be computer code "translators." This is because what is changed is the structure of the computer code and not the coding language. For example, in some embodiments of the present invention: (i) the input monolith computer program is written in high level Java programming language; and (ii) the output set of microservices is also written in high level Java programming language. However, some embodiments of the present invention may include translation capabilities where the translation is performed at the same time as the conversion of the structure of the computer program into microservices.

In the method of flow chart 250, discussed above, every function of the monolith program is converted into an equivalent microservice, such that the aggregation of the created microservices are equivalent to the monolith program considered as a whole. Alternatively, in some embodiments, only one, or only some, of the functions of the monolith program are extracted into microservices. Some embodiments may be applicable to scenarios where a monolith is broken down into two or more components. the desirable refactoring for an app owner may break out one microservice at a time and have it interact with the remainder of the monolith.

III. Further Comments and/or Embodiments

Some embodiments of the present invention recognize one, or more, of the following facts, potential problems and/or potential areas for improvement with respect to the current state of the art: (i) existing methodology creates RESTful microservices by advocating a state-less service pattern, whereby the object state and lifecycle is bounded to the duration of a single call invocation; (ii) enterprise applications have object lifecycle that typically span across multiple business process and functional areas; (iii) existing remote object access and transport schemes such as Java RMI performs object serialization for parameter passing, introducing object state replication and synchronization issues and performance hit; (iv) there is no efficient interim solution from "monolith application(s)" to stateless RESTful microservices; (v) object serialization incurs significant performance overhead and introduce object state synchronization issues; (vi) there is no semantic equivalent transformation of mono to microservice, and therefore introduces significant rewrites and associated risks; and/or (vii) object-oriented concept such as dynamic call binding, generic types, polymorphism and attribute memberships are not automatically taken care of and are left to the developers to deal with.

Some embodiments of the present invention may include one, or more, of the following operations, features, characteristics and/or advantages: (i) a method and system to generate semantically equivalent microservices from a monolith object-oriented application; (ii) a methodology and solutions to transform enterprise object-oriented applications into a functionally equivalent set of stand-alone microservices; (iii) the resultant microservice is a mutually exclusive partitioning of the application's computational logic; (iv) the resultant microservice is semantically equivalent in its behavior to that of a portion of the object-oriented code from which the resultant microservice was derived; (v) distributed object management (creation, access, reference and garbage collection) that is semantically equivalent to a centralized JVM (Java virtual machine), therefore preserving runtime semantics of the JVM in a distributed manner; (vi) produces standalone hybrid cloud services (microservice and refactored legacy) with minimal source code rewrite; and/or (vii) potentially more efficient, performance-wise, than currently conventional technology utilizing object serialization.

An embodiment of a method according to the present invention includes the following operations (not necessarily in the following order): (i) a recommended class partitioning of a monolith object-oriented application into multiple partitions is received; (ii) based upon this input, APIs (application programming interfaces) and supporting code is automatically generated by machine logic) to transform each partition into a standalone micro-service; (iii) the original classes are assigned into each separate service code base such that no compute logic is duplicated among microservices; (iv) proxy and service classes are generated for objects that needs to be accessed by more than one service partitions (for example, interface objects), such that the proxy classes are assigned to the user partition of the object, and the service classes are assigned to the owner partition of the object; (v) proxy and service together facilitate communication and invocation of the object across partitions such that no changes to the code of pre-existing monolith are needed, which is potentially advantageous because every line of code change from monolith to microservices needs to be verified and tested, and thereby generates additional risk and efforts; (vi) distributed object management is performed for a class object shared across partitions such that the objects are addressable by a global reference ID; (vii) distributed object management is performed for a class object shared across partitions such that physical object states are mapped to global reference ID through a cluster manager of a partition; (viii) remote and local object reference translation and tracking by the proxy and service classes of an object are performed such that an object instance is: (a) unique across the partitions, and (b) is globally addressable and can be garbage collected in a distributed manner, and (c) monitoring and tracking object access (read and write) for remote object access and analyzing the resulting trace to produce object access patterns and object lifecycle as feedback to refine microservice partitioning recommendations; and (ix) monitor and track object access (read and write) for remote object access and analyzing the resulting trace to produce object access patterns and object lifecycle as feedback to refine microservice partitioning recommendations. In this method, the use of proxy classes ensures semantically equivalent access to an object when the object state is managed by a different partition. By preserving the invocation call code, as described in operation (v) of the foregoing method, some embodiments may remove said risk and verification efforts. The performance and reference tracking of operation (ix) in this method ensures distributed JVM operations are semantically equivalent to a local JVM operation.

Figure 5:
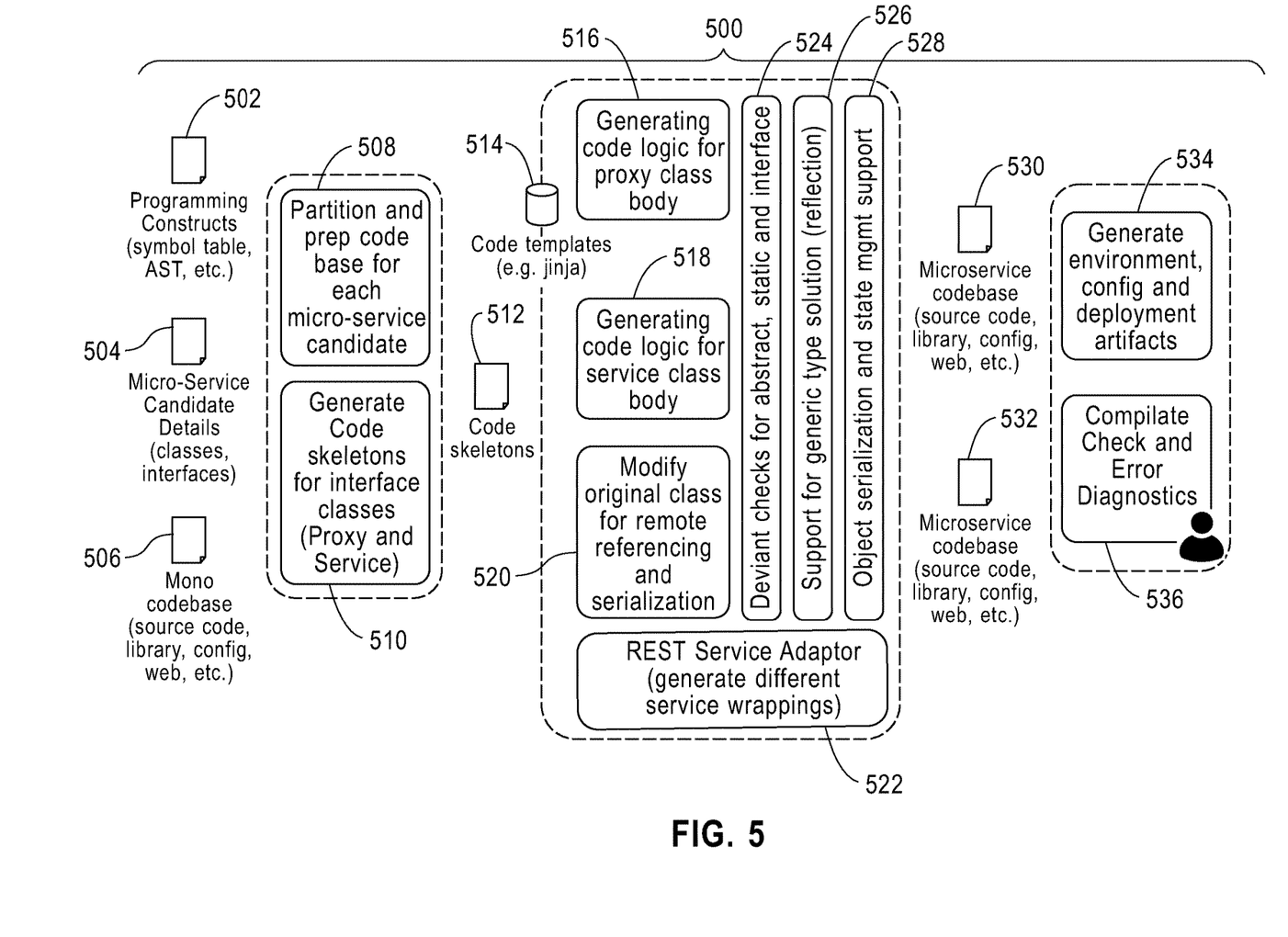
FIG. 5 is block diagram illustrating aspects of some embodiments of the present invention.

An API (application programming interface) Generation Pipeline is shown by diagram 500 of FIG. 5. Diagram 500 includes: programming constructs block 502; micro-service candidate block 504; mono codebase block 506; npartition and prep code block 508; generate code skeletons block 510; code skeletons block 512; code templates block 514; proxy class block 516; service class block 518; remote referencing block 520; REST (representational state transfer) adaptor block 522; deviant checks block 524; generic solution block 526; object serialization block 528; first microservice codebase block 530; second microservice codebase block 532; generate environment block 534; and compilate check block 536.

The inputs to the pipeline of diagram 500 consists of: (i) the code base for the monolithic application (source code, libraries used, and configuration files) (see block 502); (ii) microservice candidate details (including information about partitions of classes and interface classes for each partition) (see block 504); and (iii) meta information about the monolithic application, including the symbol table, class and function declarations and signatures, and abstract syntax trees (see block 506).

The output of the pipeline of diagram 500 consists of: (i) generated code for proxy and service classes for each partition (see blocks 530 and 532); (ii) some modified classes of the monolithic application (see blocks 530 and 532), and (iii) generated build, configuration, and deployment artifacts (see blocks 530 and 532). In the transformed, microservice-structured application produced by the pipeline, API-driven communication occurs across partitions (which occurred as Java method calls in the monolith version), while preserving the language-level semantics of the monolith.

The first stage of the pipeline of diagram 500 initializes the code base for each microservice partition and generates code skeletons for interface classes of each partition (see blocks 508, 510 and 512).

The second stage of the pipeline, represented by blocks 516, 518, 520, 522, 524, 526 and 528, performs code generation for proxy and service classes. This stage takes as input the code skeletons created in the previous stage discussed in the previous paragraph. To generate code for a proxy/service class, this stage uses a set of code templates. A code template is a model or prototype of the Java code to be generated for proxy and service classes. It is expressed in a templating language and is implemented using programming constructs of the templating language, together with Java code. One embodiment of the invention uses the Jinja templating language, but, alternatively, other templating languages could be used. The code-generation process takes a code template and transforms it into executable Java code by rendering it through a templating engine. In this manner, the second stage generates executable code in the Java language for the proxy classes and the service classes for each microservice partition. Operations of the second stage also modify some of the original monolith classes to enable referencing of remote objects in a partition. Additionally, the second stage generates supporting/utility Java classes that facilitate serialization and deserialization of method call parameters for enabling communication across partitions, based on dynamic checking of parameter types. The communication across partitions is done by communications of computer code that are formed and formatted to work with REST APIs (herein sometimes referred to as "API communication"). Thus, the code generator generates appropriate service and client code to enable API communication, and different service wrappings for API communication, corresponding to different Java libraries for REST, could be employed. Finally, the second stage of the pipeline: (i) performs various checks on interface classes and the parameters of their methods to ensure that the transformation has preserved semantics as used in the original monolith style program; and (ii) also identifies parts of the code that may need to be manually updated by developers (for example, in some embodiments, these parts of the code are highlighted in a visual display of the code so that human individual developers can easily locate them).

The third and final stage of the pipeline of at blocks 534 and 536 of diagram 500: (i) performs compilation checks on the generated code to ensure that the code is syntactically correct; and (ii) generates build, configuration, and deployment artifacts for each microservice partition so that the partition can be deployed as an independent microservice.

Figure 6:
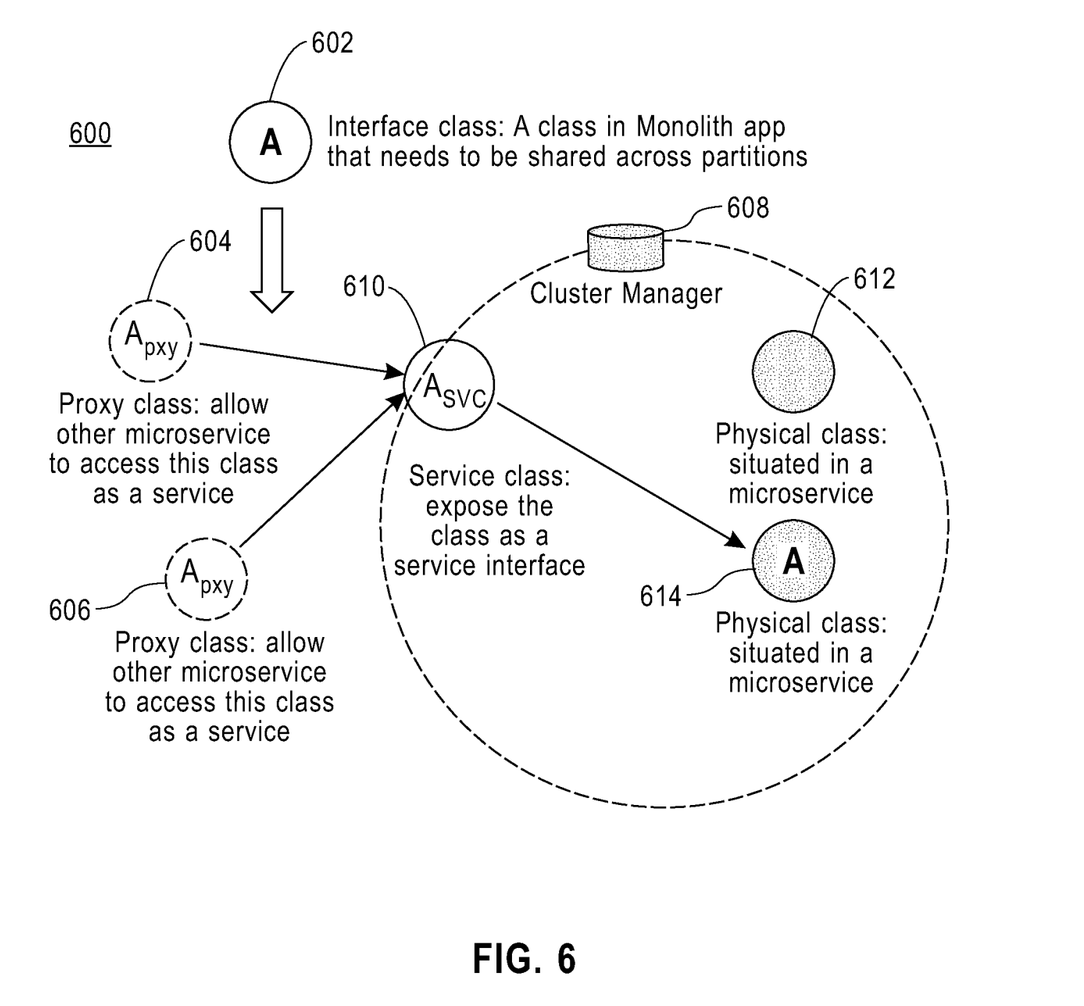
FIG. 6 is another block diagram illustrating aspects of some embodiments of the present invention.
Figure 7:
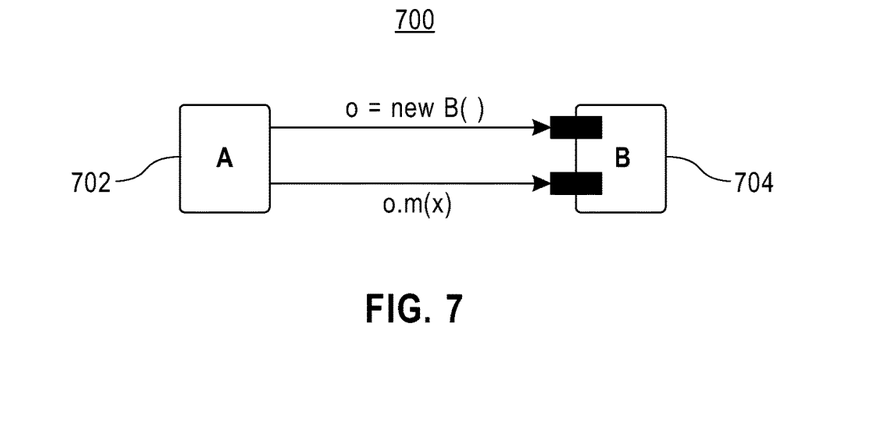
FIG. 7 is another block diagram illustrating aspects of some embodiments of the present invention.
Figure 8:
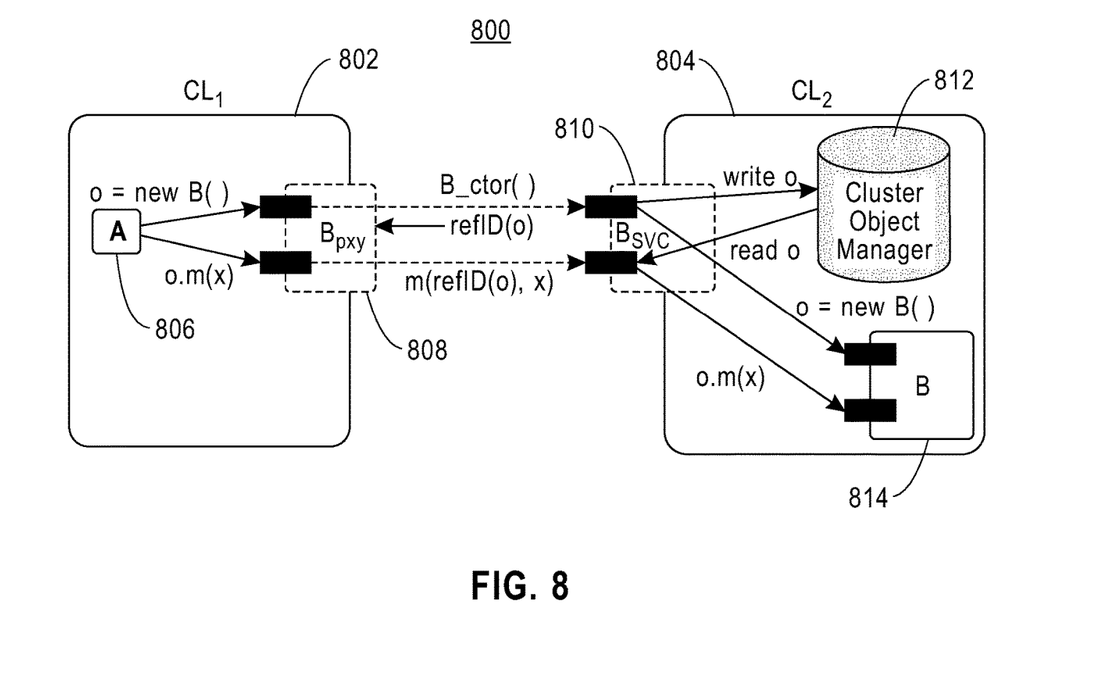
FIG. 8 is another block diagram illustrating aspects of some embodiments of the present invention.
Figure 9:
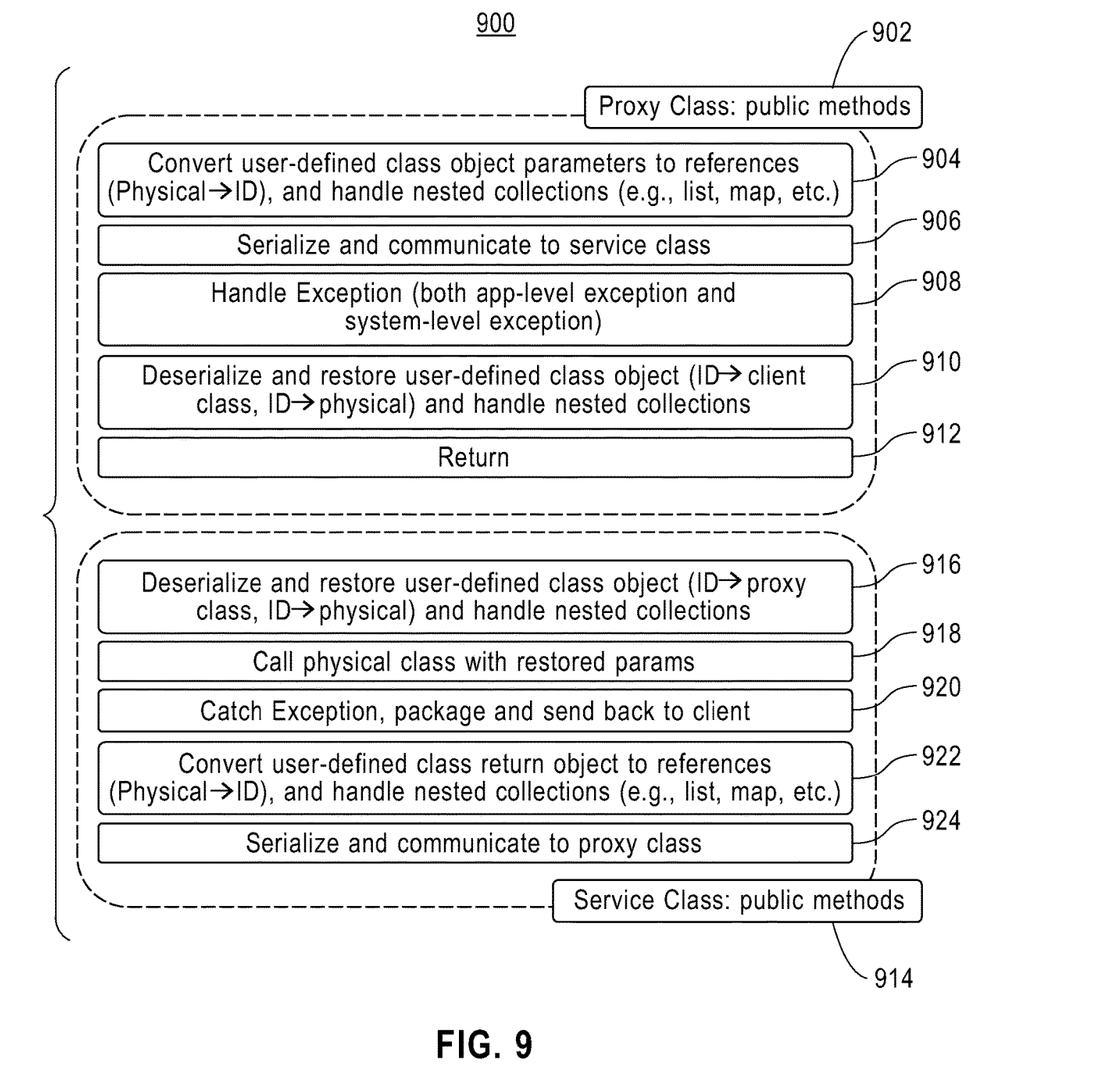
FIG. 9 is another block diagram illustrating aspects of some embodiments of the present invention.

Diagram 600 of FIG. 6, diagram 700 of FIG. 7, diagram 800 of FIG. 8, and diagram 900 of FIG. 9 collectively show an anatomy of a class that has been exposed such that it can be used by a substantial group of developers.

Diagram 600 of FIG. 6 shows the basic transformation that is done for an "interface class," including: (i) interference class status 602; (ii) proxy class status 604, 606; (iii) service class status 610; and (iv) physical class status 612, 614 (cluster manager 608 is involved in the part of the transformation from service class to physical class).

An interface class is a class of the monolith that needs to be shared across partitions. Thus, such a class C is accessed from classes that are outside the partition to which C belongs. The basic transformation for an interface class C creates a service class for C in the partition where C belongs, and a proxy class for C in each partition (other than the partition containing C) from where C is accessed. The service class for C serves as a wrapper class that receives RESTful API calls from outside the partition and makes Java method calls corresponding to the API calls on physical objects (that is, instances of) C in the partition. A proxy class for C enables a class outside the partition of C to make a Java method call that is forwarded as a REST API call to the service class for C.

Diagram 700 of FIG. 7 illustrates a Java method call that occurs between class A (see block 702) and class B (see block 704) in the monolithic application. A method in class A first calls the constructor of class B to create an instance or object o of type B. Then, the said method in class A calls method m (defined in class B) on the object o, passing variable x as a parameter to the method call.

Diagram 800 of FIG. 8 illustrates how the Java method call of diagram 700 is transformed into a REST API call by the method of the invention. Diagram 800 includes: first class block 802 (including block A 806 and block Bpxy 808); and second class block 804 (including block Bsvc 810, cluster object manager block 812 and block B 814).

First class block 802 is a running standalone microservice where part of the refactored classes from the monolith is hosted and running. Block A 806 is a class A object (same code as the said class A in the monolith). Block Bpxy 808 is the proxy class B object (the proxy class created from class B of the monolith).

Second class block 804 is the microservice where the class B object is hosted (hence any access to this class object should be communicated with this microservice). Block Bsvc 810 is the service class of B where all invocations to class B is now a API service call to this service class. Cluster object manager block 812 tracks the class objects referenced outside this microservice, and is used to look up and link to the specific class objects referred to by the API call to the service. Block B 814 is the class B object (same codebase as in the monolith) that is hosted by this microservice.

In this example, classes A and B belong to different partitions $CL_1$ and $CL_2$, respectively. Class B is identified as an interface class because it is accessed from outside the partition, in particular, by class A in partition $CL_1$. Therefore, a service class $B_{svc}$ for class B is created in partition $CL_2$, and a proxy class $B_{pxy}$ for class B is created in partition $CL_1$. $B_{pxy}$ contains a definition of each public method and constructor of B, and $B_{svc}$ contains a REST API endpoint definition for each public method and constructor of B.

The call to the constructor of B in the monolith occurs as a call to the corresponding constructor defined in $B_{pxy}$ in the transformed application. The constructor of $B_{pxy}$ makes a REST API call to the API endpoint in $B_{svc}$ corresponding to the constructor. The API endpoint method then calls the constructor of B to create an object o of type B. This occurs as regular Java object construction, for example, as illustrated for the monolith of diagram 700. The API endpoint method adds o to the cluster object manager for partition $CL_2$. The cluster object manager generates a reference ID for o which is returned to the API endpoint method. The API endpoint method then returns the said reference ID as response for the REST API call. The constructor in $B_{pxy}$ next returns an object o, which is an instance of $B_{pxy}$ to the method in class A that called the constructor initially.

The method now has an object instance o, on which it calls method m with parameter x. The method m defined in $B_{pxy}$ serializes parameter x or converts it to a reference ID if needed (that is, if x is an instance of a class defined in partition $CL_1$). Then, the method m makes a REST API call to the API endpoint in $B_{svc}$ corresponding to method m, passing the serialized version or reference ID of x and the reference ID of o as parameters of the REST API call. The API endpoint method corresponding to m in $B_{svc}$ uses the reference ID of o received as API request parameter to retrieve the physical object o from the cluster object manager. Then, the API endpoint method deserializes parameter x or creates a proxy object for x and calls method m on the object o retrieved from the cluster object manager, passing the deserialized x or proxy object for x as parameter to the method call. With this sequence of steps, a Java method call in the monolith as illustrated in diagram 700 is transformed into a REST API call in a semantics-preserving manner.

Diagram 900 of FIG. 9 shows the actions performed in the automatically generated proxy class (see block 902) and service class (see block 914) to enable API communication across partitions.

The proxy class actions of block 902 are: (i) block 904, where a user defined class object parameters are converted into the form of references (physical to ID) and nested connections (for example, list, map, etc.) are handled; (ii) block 906, where the user defined class object parameters are serialized and communicated to a service class; (iii) block 908, where any app-level exceptions and any system level exceptions are handled; (iv) block 910, where the user defined class object parameters are de-serialized and restored (ID to client class and ID to physical) and nested connections are handled; and (v) block 912, which represents a return operation.

The service class actions of block 914 are: (i) block 916, which represents deserialization and restoration of the user-defined class object (ID to proxy class) and the handling of nested collections; (ii) block 918, which represents the calling of the physical class with restored user defined class object parameters; (iii) block 920, which represents the catching of exceptions, the packaging of exceptions and the sending back to the client an identification of any exceptions; (iv) block 922, which represents conversion of the user defined class return object to references (physical to ID) and the handling of nested collections (for example, list, map, etc.); and (v) block 924, which represents serialization and communication to the proxy class.

A proxy class for class C defines each public method of class C. A method defined in the proxy class serves as a client of a REST API call. The said proxy method converts each of its formal parameters, including the receiver "this" parameter for a virtual method call, into a string representation: the string can represent either a reference ID of a remote Java object or the serialized form of a local Java object. The converted string representations are sent as parameters to the REST API call made from the proxy method to a REST API endpoint defined in a service class.

The proxy method also handles all exception responses from the REST API call. An exception response can occur because: (i) an unhandled exception is raised during execution of the Java method called by the REST API endpoint method (such an exception could be an explicit exception thrown in the application/library code or an exception raised in the Java Virtual Machine, for example, a null pointer exception), or (ii) an exception occurs because of a failure in the REST communication mechanism. For case (i), the API endpoint method catches the exception and wraps it into a special exception and returns it to the proxy method. The proxy method unwraps the exception and rethrows the original exception. In this way, the behavior of exception propagation on the call stack in the monolithic application is preserved in the REST API calls that occur in the transformed application. For case (ii), the proxy method throws a runtime exception signaling the REST communication failure. On successful completion of the REST API call, the proxy method deserializes the response received, if any, into a Java object, which can be a physical object (representing a local object) or a proxy object (representing a remote object). Finally, the proxy method returns the physical or proxy object.

The service class defines a REST API endpoint method for each public method of class C. An API endpoint method performs the reverse of the serialization done by the proxy method: it converts each string parameter received in the REST API call into a Java object that can be a physical object (representing a local object fetched from the cluster object manager using a reference ID) or a proxy object (representing a remote object, constructed using the object's reference ID). The API endpoint method also retrieves the receiver object from the cluster object manager for a virtual method call. Then, the API endpoint method makes a Java method call (as either a virtual or a static method call) and obtains the return value, if any, from the method call. The returned value is serialized into a string and sent as REST response back to the proxy method that initiated the REST API call. The API endpoint method also catches any exception that occurs during the execution of the Java method call, wraps the exception into a special exception, and sends an error response back to the proxy method. The serialization/deserialization logic in the proxy method and the service API endpoint method handles arbitrarily nested collections, maps, and arrays, containing both physical and proxy objects. The logic recursively traverses these objects at runtime and converts each physical/proxy object to a string, or vice versa, based on the runtime type information, to perform serialization/deserialization in an accurate manner, thereby preserving the behavior of the monolithic application in the transformed application.

Figure 10:
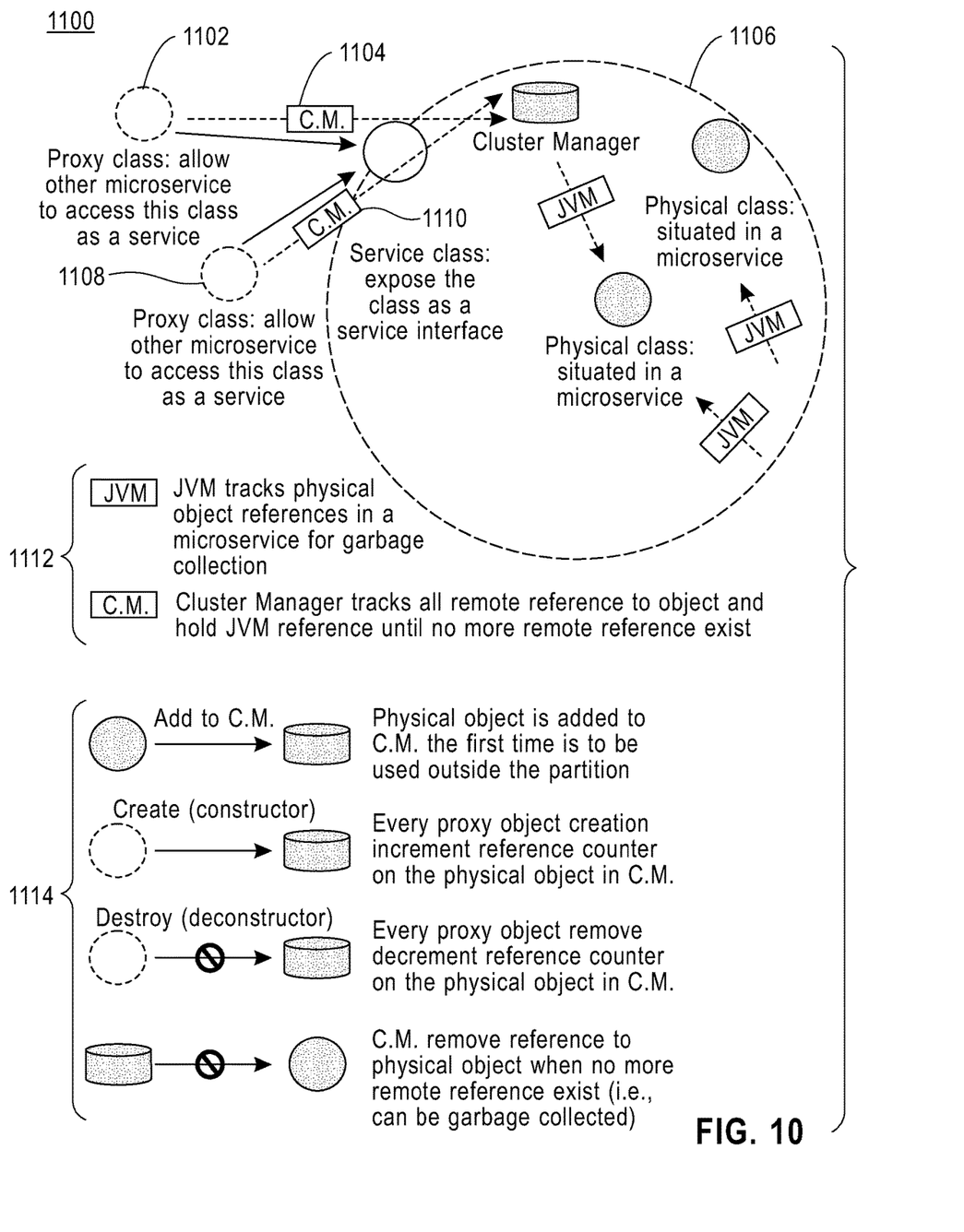
FIG. 10 is another block diagram illustrating aspects of some embodiments of the present invention.

Diagram 1100 of FIG. 10 describes an embodiment of distributed garbage collection. As shown in FIG. 10, diagram 1100 includes: first proxy class object 1102, first call operation 1104, microservice 1106, second proxy class object 1108, block 1110, Java virtual machine and cluster manager block set (also may be referred to as JVM/CM) 1112, and garbage collection process 1114. Each of these blocks will now be discussed in the following paragraphs.

First proxy class object 1102 is a class object instance outside of microservice 1106 (that is, the class object resides in one microservice, while its proxy class object resides in another microservice). First call operation 1104 represents an operation of receiving a call from proxy class to the service class to update the reference counter on the proxy class object block in the JVM/CM. Block 1104 illustrates the process of how the reference counter of an object, as managed by the JVM/CM, is updated.

A visual inspection of microservice 1106, as shown in FIG. 10, shows what components reside in a typical microservice that participates in distributed garbage collection processes according to various embodiments of the present invention. Second proxy class object 1108 illustrates that a class object can have one or more proxy class objects referencing it from outside its associated microservice (in this example, microservice 1106). Second call operation 1110 represents a call from proxy class to the service class (similar to first call operation 1104). Second call operation illustrates that the reference counter of a class object as managed by the Cluster Manager may be updated by any of the proxy class objects of the said class object.

Garbage collection process 1114 is an embodiment of a method for garbage collection according to the present invention and includes four operations as follows: (i) add to CM, where a physical object is added to a cluster manager (in this example, JVM/CM 1112) the first time that the physical object is to be used outside of a given partition; (ii) create (constructor) for every proxy object creation an increment reference counter on the physical object in the CM; (iii) destroy (destructor) operation for every proxy object removes a decrement reference counter on the physical object in the CM; and (iv) CM removes the reference to the physical object when no more remote reference(s) exist, meaning that the garbage can be collected.

Diagram 1100 illustrates how distributed garbage collection works in the transformed application such that it maintains the (centralized) garbage-collection semantics of the monolith. In the monolith application, in simple terms, the Java Virtual Machine (JVM) maintains a reference count for each created object. When the reference count for an object goes down to zero, the heap memory occupied by the object is reclaimed by the garbage collector. This behavior is simulated in the distributed environment of the transformed application, where each partition has its own JVM instance running and an object created in a partition (that is, the JVM running in the partition) can have remote references in other partitions/JVMs (in addition to local references in the JVM where the physical object exists). The generated service class for class C provides an "incrementor" API endpoint method for incrementing object reference count by one and a "decrementor" API endpoint method for decrementing object reference count by one for each object of type C. The reference count for a physical object is stored in the cluster object manager of the partition where C is defined. When a remote reference is created in another partition/JVM, which occurs when a proxy object for C is created in that partition/JVM, the proxy class calls the incrementor API endpoint to increase the reference count for the respective physical object by one. The generated proxy class implements a finalizer method (a finalizer method, if defined in a Java class, is automatically called by the JVM when an instance of that class is about to garbage collected); the finalizer method calls the decrementor API endpoint to decrease the object reference count by one.

Thus, whenever a proxy object (that is, a new remote reference) is created, the remote reference count for the physical object is incremented, and whenever a proxy object is garbage collected, the remote reference count for the physical object is decremented. In this way, the reference counting for objects that is done implicitly by the JVM is done explicitly for remote objects/references in the distributed setting of microservices. When the reference count for an object o stored in the cluster object manager goes down to zero, it indicates that no remote references exist for o; therefore, the cluster object manager removes o from the object store. At this point, if there are no local references to o in the JVM, o would be garbage collected by the JVM. The method, in this manner, ensures that the garbage-collection behavior of the monolith is preserved in the transformed application.

Distributed garbage collection of objects ensures a class object that is shared across multiple microservices is removed appropriately when there exists no reference to the object from any of the microservices. This is semantically equivalent to centralized garbage collection of the said object in the monolith application. Diagram 11 depicts the mechanism and procedure of the distributed garbage collection. As shown in, and/or related to, diagram 1100: (i) all references to a class object outside the partition is tracked with referenceID by the proxy object; (ii) cluster management holds memory reference of the above object in the microservice; (iii) the object in the microservice also holds its own memory reference; (iv) as long as memory reference to an object exist in the microservice, the object will not be subject to garbage collection; (v) when an object is to be referenced (that is, passed as parameter or return value) to outside the microservice, the CM will hold a memory reference to the object; (vi) when a proxy class is created by said object, a reference counter is created/incremented on the object; (vii) when a proxy class is destroyed by said object, a reference counter is decremented on the object; and (viii) when the reference counter of an object reaches 0, the cluster manager removes its memory reference to said object.

When a system class object is passed as parameter or return value to outside the partition, it is not serializable.

Some embodiments may generate a wrapper class that inherits the system object, and overrides every public method of the system class with an access method wherein the corresponding system class method is invoked. The wrapper class is to be used as replacement for the system class in the microservice code, and proxy and service of wrapper class can be generated accordingly to the mechanisms described prior.

Some embodiments of the present invention implement a technique for dealing with system objects (for example, java.io.PrintWriter), which is sometimes herein referred to as "system object wrapping." System object wrapping basically adds another step as preprocessing, wherein a new wrapper class is created that inherits the system class, and public methods and attributes of system objects are access controlled by getter/setter methods. System object wrapping includes passing of JVM-specific resources, such as print streams and file handles (and, more generally, system classes) as method parameters, are handled in the distributed setting of microservices, consisting of multiple JVMs. References to JVM-specific resources cannot be serialized and passed across partitions/JVMs via REST API calls because, by definition, such resources exist within a JVM. For system classes that do not represent JVM resources, serializing and sending them across partitions results in two separate copies of the object, one each in the caller and callee partitions. Thus, any state update on one copy of the object is not visible in the other copies, which breaks the semantics of the monolith, in which a state update via one object reference is visible via the other object reference across method calls. To handle both these cases in a uniform manner, the method generates service and proxy classes for system classes, stores system objects (just like non-system objects) in cluster object manager, and generates reference IDs for those objects, which are passed across partitions. For example, a service class $PW_{svc}$ is generated that implements an API endpoint method for each public method of the standard Java Development Kit java.io.PrintWriter class. Each API endpoint method receives the reference ID of a PrintWriter object, along with any other parameter that a PrintWriter method takes. The API endpoint method uses the reference ID to retrieve the physical PrintWriter object from the cluster object manager, and calls the corresponding method on the object after deserializing the method's parameters, as discussed earlier.

The REST API call to method m2 of class B that occurs in class A sends the reference ID for the PrintWriter object after adding the object to the cluster object manager. In the partition where class B exists, the service class $B_{svc}$ performs a Java method call on the object for class B (after retrieving it from the cluster object manager). The parameter pw of method B.m2 refers to an automatically generated proxy class $PW_{pxy}$ for java.io.PrintWriter. The import statements in class B are automatically rewritten to ensure this. The proxy class $PW_{pxy}$ extends java.io.PrintWriter and implements (that is, overrides) each public method of java.io.PrintWriter, and holds a reference ID of a remote PrintWriter object. The proxy method serializes any received parameters and calls the corresponding API endpoint method of $PW_{svc}$, which then makes the actual method call on a physical PrintWriter object. This mechanism of generating proxy/service classes for system classes and rewriting monolith classes to refer to the generated proxy class, instead of the original system class, preserves the monolith behavior with respect to passing system object across methods in the distributed setting of the transformed application, consisting of microservices.

Some embodiments of the present invention may include one, or more, of the following operations, features, characteristics and/or advantages: (i) automates the division of a monolith application and generate semantic equivalent objects and interfaces; (ii) a mechanisms and/or solution for creating functional and semantic equivalent microservices from a monolith style computer program; and/or (iii) provides the means to automate the breakage and the necessary changes to application to make the resulting service functional and semantically equivalent to the monolith.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving a monolithic form computer program including object-oriented computer code that utilizes a plurality of objects;
determining a plurality of partitions in the object-oriented computer code; and
for each given partition of the plurality of partitions, automatically generating a microservice that is functionally and semantically equivalent to the first partition of the object-oriented computer code;
wherein the automatically generated microservices collectively form a computer program that is functionally equivalent to the monolithic form computer program; and
the automatically generated microservices collectively form the computer program that performs distributed object creation management that is semantically equivalent to a centralized JVM (Java virtual machine), therefore preserving runtime semantics of the JVM in a distributed manner;

the automatically generated microservices collectively form the computer program that performs distributed object access management that is semantically equivalent to a centralized JVM (Java virtual machine), therefore preserving runtime semantics of the JVM in a distributed manner; and the automatically generated microservices collectively form the computer program that performs distributed garbage collection that is semantically equivalent to a centralized JVM (Java virtual machine), therefore preserving runtime semantics of the JVM in a distributed manner.

* * * * *